United States Patent
Kühne et al.

(10) Patent No.: US 9,991,564 B2
(45) Date of Patent: Jun. 5, 2018

(54) ELECTROCHEMICAL ENERGY STORE COMPRISING A CONDUCTIVITY SECTION FOR OVERCHARGE PROTECTION

(71) Applicant: Siemens Aktiengesellschaft, Munich (DE)

(72) Inventors: Michael Kühne, Furth (DE); Thomas Soller, Deggendorf (DE)

(73) Assignee: Siemens Aktiengesellschaft, Munich (DE)

( * ) Notice: Subject to any disclaimer, the term of this patent is extended or adjusted under 35 U.S.C. 154(b) by 13 days.

(21) Appl. No.: 15/027,500

(22) PCT Filed: Oct. 6, 2014

(86) PCT No.: PCT/EP2014/071322
§ 371 (c)(1),
(2) Date: Apr. 6, 2016

(87) PCT Pub. No.: WO2015/055451
PCT Pub. Date: Apr. 23, 2015

(65) Prior Publication Data
US 2016/0248124 A1    Aug. 25, 2016

(30) Foreign Application Priority Data

Oct. 14, 2013 (EP) ..................... 13188495

(51) Int. Cl.
*H01M 10/42* (2006.01)
*H01M 2/14* (2006.01)
(Continued)

(52) U.S. Cl.
CPC ....... *H01M 10/4207* (2013.01); *H01M 2/145* (2013.01); *H01M 2/1646* (2013.01);
(Continued)

(58) Field of Classification Search
CPC .. H01M 4/134; H01M 4/381; H01M 10/4207; H01M 10/054; H01M 10/0563; H01M 10/0562; H01M 10/058
See application file for complete search history.

(56) References Cited

U.S. PATENT DOCUMENTS

| | | | |
|---|---|---|---|
| 4,208,475 A | 6/1980 | Paruso et al. | |
| 5,028,499 A | 7/1991 | Pearce et al. | |

(Continued)

FOREIGN PATENT DOCUMENTS

| | | |
|---|---|---|
| DE | 3926977 A1 | 2/1991 |
| JP | S47025212 B | 7/1972 |

(Continued)

OTHER PUBLICATIONS

JP Office Action dated Jun. 19, 2017, for JP patent application No. 2016522800.

*Primary Examiner* — Stewart A Fraser
*Assistant Examiner* — Rachel L Zhang
(74) *Attorney, Agent, or Firm* — Beusse Wolter Sanks & Maire

(57) ABSTRACT

An electrochemical energy store with an anode, which is electrically connected to an anode space in which an anode material with a first fill level is arranged, and a cathode, which is electrically connected to a cathode space in which a cathode material with a second fill level is arranged, and an ion-conducting separator, which separates the anode space from the cathode space. The ion-conducting separator has a top region and a base region, wherein at least one conductivity section is provided in the top region of the ion-conducting separator, which conductivity section has greater electrical conductivity during correct operation of the electrochemical energy store than an electrically insulating insulation section in the base region, wherein at least one state of charge of the electrochemical energy store exists (Continued)

in which the anode material makes contact with the conductivity section in the anode space.

21 Claims, 2 Drawing Sheets

(51) Int. Cl.
*H01M 2/16* (2006.01)
*H01M 2/34* (2006.01)
*H01M 10/39* (2006.01)
*H01M 4/134* (2010.01)
*H01M 4/38* (2006.01)
*H01M 10/054* (2010.01)
*H01M 10/0562* (2010.01)
*H01M 10/0563* (2010.01)
*H01M 10/058* (2010.01)
*H01M 4/02* (2006.01)

(52) U.S. Cl.
CPC ........... *H01M 2/342* (2013.01); *H01M 4/134* (2013.01); *H01M 4/381* (2013.01); *H01M 10/054* (2013.01); *H01M 10/058* (2013.01); *H01M 10/0562* (2013.01); *H01M 10/0563* (2013.01); *H01M 10/39* (2013.01); *H01M 10/3918* (2013.01); *H01M 2004/027* (2013.01); *H01M 2010/4271* (2013.01)

(56) References Cited

U.S. PATENT DOCUMENTS

| | | | |
|---|---|---|---|
| 2010/0231166 A1* | 9/2010 | Lee | H02J 7/0016 320/118 |
| 2011/0236743 A1 | 9/2011 | Kumar et al. | |
| 2012/0194140 A1* | 8/2012 | Rijssenbeek | H01M 10/652 320/134 |
| 2013/0040171 A1 | 2/2013 | Galloway | |
| 2013/0082642 A1 | 4/2013 | Yerramalli et al. | |

FOREIGN PATENT DOCUMENTS

| | | |
|---|---|---|
| JP | S5590470 A | 7/1980 |
| JP | H07230822 A | 8/1995 |
| JP | H07282844 A | 10/1995 |
| JP | 2013041825 A | 2/2013 |
| WO | 9103080 A1 | 3/1991 |

* cited by examiner

ELECTROCHEMICAL ENERGY STORE
COMPRISING A CONDUCTIVITY SECTION
FOR OVERCHARGE PROTECTION

CROSS REFERENCE TO RELATED
APPLICATIONS

This application is the US National Stage of International Application No. PCT/EP2014/071322 filed Oct. 6, 2014, and claims the benefit thereof. The International Application claims the benefit of European Application No. EP13188495 filed Oct. 14, 2013. All of the applications are incorporated by reference herein in their entirety.

FIELD OF INVENTION

The present invention relates to an electrochemical energy store with an anode, which is electrically connected to an anode space in which an anode material with a first fill level is arranged, and a cathode, which is electrically connected to a cathode space in which a cathode material with a second fill level is arranged, and an ion-conducting separator, which separates the anode space from the cathode space. The invention also relates to an electrochemical storage module, which comprises at least two such electrochemical energy stores. The invention also comprises a method for producing an electrochemical energy store of this type.

BACKGROUND OF INVENTION

Electrochemical energy stores within the meaning of the invention can operate at any service temperature range required. However, a service temperature range of 100° C. to 500° C. is specifically preferred. This service temperature range encompasses electrochemical energy stores which operate on the basis of sodium-nickel chloride cell and sodium-sulfur cell technology. Sodium-nickel chloride cells can also be configured such that at least part of the nickel in the cell is replaced or supplemented by iron. In their anode space and cathode space respectively, energy stores of this type are provided with a corresponding anode material or cathode material which, at the service temperatures thereof, is essentially in the liquid state. Accordingly, in the case of a sodium-nickel chloride cell, the anode material is liquid sodium. In a sodium-nickel chloride cell, a cathode material is also present in the cathode space, which is at least partially in the liquid state, and comprises a salt mixture of nickel, common salt and further additives. Given the liquid inventory present in the device, the fill level of the anode material or cathode material is subject to the earth's gravitational field, and is exceptionally easy to determine as a result. The fill level or fullness level corresponds to the average fullness level of the material (anode material, cathode material) in the respective space (anode space, cathode space) during the normal use of the energy store. In conjunction with the normal use of the energy store, the fill level or fullness level changes as the service life proceeds. Where the relevant material is only intended to be partially present in the liquid phase, the definition of the fullness level will refer to the respective liquid phase of said material.

In order to obtain technically relevant voltage values from storage systems which comprise a plurality of electrically connected electrochemical energy stores of this type, a plurality of individual energy stores are customarily connected in series and combined in strings. Electrochemical storage modules include strings of this type. Accordingly, in the context of the invention, the concept of the string and the storage module are considered as equivalent concepts hereinafter.

In electrochemical storage modules of this type, in some cases, the scatter band of the capacities of individual energy stores is a substantially significant factor for the design and the functional properties of the system as a whole. Specifically, the smallest capacity of an individual energy store dictates the maximum useful capacity of the entire string of energy stores. A comparable observation can apply to the different states of charge of the individual energy stores in a string of this type. Accordingly, the state of charge of the energy store with the highest state of charge in a string of this type dictates the time at which the entire system is fully-charged, whereas the energy store with the lowest state of charge dictates the time at which the entire system is discharged. If, for example, a charging voltage continues to be applied to an individual energy store after full charging, further unwanted conversion reactions may proceed in the active interior space of the energy store, which can sometimes contribute to interference, damage, or even the destruction of the energy store. Accordingly, the further charging of a string is to be avoided, if one energy store has already achieved its full state of charge. Likewise, it is possible that the discharging of an energy store which is already fully discharged might cause impairments of this type. Accordingly, the discharging of a string is also to be avoided, if one individual energy store is already fully discharged. It is therefore a technical imperative that the energy stores in an electrochemical storage module should be charged or discharged in consideration of these defining conditions.

As already described above, electrochemical energy stores in a storage module of this type will consistently show a scatter band in respect of their capacities or states of charge. In the first instance, this scatter band is attributable to manufacturing factors, as not the entire weighed-in quantity of active material (anode material, cathode material) on the interior of the energy store contributes to the available capacity. Influences upon capacity associated with the particle size of active materials are also known. Moreover, during the operation of an energy store, distance-related electronic conduction paths may form between individual islands in the active material (percolation), resulting in a structural change, and consequently a change in the electrical parameters of the energy store. Accordingly, electrochemical reactions can only proceed in those areas of the anode or cathode which are provided with a sufficient electrical connection throughout the entire conversion time to act as a current collector for the energy store. Electrically isolated zones make no contribution, or substantially no contribution, to the conversion reaction.

Service-related changes in the individual components of the energy store may also contribute to a scatter band of the capacities or states of charge of the individual energy stores in an electrochemical storage module. It is known, for example, that thermal stresses occur during operation, which can lead to the propagation of micro-cracks in the ion-conducting separator. In the case of an energy store based upon the principle of a sodium-nickel chloride cell, this separator is a ceramic separator, comprised of Na-$\beta$-Al$_2$O$_3$ or Na-$\beta$''-Al$_2$O$_3$. Upon the occurrence of micro-cracks in this ceramic separator, for example at service temperatures, elementary sodium from the anode space can react directly with the cathode material (liquid electrolyte) in the cathode space to form elementary aluminum and common salt. As a consequence of this reaction, the electronic resistance of the ion-conducting separator might be reduced, thereby resulting in a continuous self-discharging of the energy store. If, for example, an ion-conducting separator of this type typically shows an electronic resistance of several MΩ, a damage-related reduction in the electronic resistance, for example down to 10 kΩ, at a cell voltage of 2.5V, might result in the flow of a continuous self-discharging current of 0.25 mA.

Accordingly, in the presence of an electrical series circuit of individual electrochemical energy stores, the energy store with the smallest capacity or the lowest state of charge will be the first to reach the time of complete discharging. If, at this time, the energy store continues to receive a discharge current flowing in the same direction, this might cause a polarity reversal in the already discharged energy store, generally resulting in irreversible damage, to the extent of the damage-related failure of said energy store.

Conversely, if an electrochemical storage module with series-connected electrochemical energy stores continues to be charged beyond the point in time at which the first energy store has achieved a complete state of charge, the charging voltage in the energy store which has already been charged will generally rise to unacceptably high values, whereby irreversible chemical reactions might again impair the functional components of the energy store, or damage the energy store to the extent that the latter fails.

In order to prevent potential damage to individual energy stores in an electrochemical storage module of this type during both charging and discharging, simple means are conventionally implemented in the attempt to prevent overcharging or exhaustive discharge. For example, upon the initial constitution of the electrochemical storage module, an advantageous preselection can be achieved by the targeted sorting of individual energy stores, the capacity of which does not lie within a narrow tolerance range. Likewise, in the operation of the energy store in the electrochemical storage module, only a proportion of the capacity actually available may be used. For example, only 80% of the full available capacity may be exploited, thereby reducing, however, both the flexibility and the efficiency of the system as a whole.

In part, in the conventional operation of individual electrochemical energy stores in a storage module, targeted servicing measures are undertaken in order to protect against damage associated with overcharging or excessive discharging. For example, equalization of the individual states of charge of the various energy stores can be achieved by the targeted charging or replacement of individual energy stores. However, within a given maintenance interval, such measures cannot prevent an increasing scatter in the state of charge of individual electrochemical energy stores, such that an increasing impairment in the available capacity of the system as a whole must be anticipated.

SUMMARY OF INVENTION

An object of the invention is therefore the prevention of these disadvantages which are known from the prior art. Specifically, it is intended to achieve the appropriate equalization of the states of charge of individual electrochemical energy stores in a storage module during charging, simply and without additional circuitry. It is also desirable that the overcharging of individual energy stores in a storage module should be prevented, even during a maintenance interval, thereby preventing damage associated with overvoltages or unwanted chemical reactions. It should also be possible for individual energy stores to be operated securely, with no hazard to the user, thereby simultaneously increasing the service life of an electrochemical energy store which is connected in-circuit in a storage module.

These objects of the invention are fulfilled by an electrochemical energy store, by an electrochemical storage module, and by a method for producing an electrochemical energy store of this type as claimed.

Specifically, these objects of the invention are fulfilled by an electrochemical energy store with an anode, which is electrically connected to an anode space in which an anode material with a first fill level is arranged, and a cathode, which is electrically connected to a cathode space in which a cathode material with a second fill level is arranged, and an ion-conducting separator, which separates the anode space from the cathode space, wherein, in the normal operation of the electrochemical energy store, the ion-conducting separator is provided with a top region and a base region whereby, in the top region of the ion-conducting separator, one or at least one conductivity section is provided which, in the normal operation of the electrochemical energy store, has a higher electronic conductivity than an electronically-insulating insulation section in the base region, such that at least one state of charge of the electrochemical energy store exists in which the anode material in the anode space, and potentially also the cathode material in the cathode space, are bonded with the conductivity section. It should be noted, however, that the bonding of the conductivity section with the cathode material is not absolutely essential to the operation of the invention. However, as further described in detail hereinafter, bonding of the conductivity section with the anode material must be ensured.

The objects of the invention are also fulfilled by an electrochemical storage module, which is provided with at least two of the above-mentioned electrochemical energy stores, as also described hereinafter, which are electrically interconnected in series. These objects of the invention are also fulfilled by a method for producing an above-mentioned electrochemical energy store, as also described hereinafter, and comprising the following steps: —The production of an ion-conducting separator by the formation of a molded base component; —Impregnation of the base component with additives which are appropriate to the formation of an electronically conductive conductivity section, further to heat treatment; —Heat treatment of the base component, for the stabilization thereof.

According to the invention, the anode and cathode are provided with electronically conductive zones, which can be electrically bonded for the tap-off of voltage. The anode space and the cathode space are further characterized in that they comprise electrochemically active zones, and consequently materials (anode material and cathode material) which undergo material changes as a result of electrochemical reactions.

The first fill level of the anode material, and the second fill level of the cathode material typically vary in accordance with the different states of charge (or discharge states) in which different quantities of the anode material and cathode material are electrochemically converted. In this regard, the quantity of anode material is inversely correlated to the quantity of cathode material (in an association defined by stoichiometric conversion formulae), i.e. in case of an increase in the anode material associated with the charging of the energy store, the quantity of cathode material declines correspondingly. As the anode material and/or the cathode material are at least partially arranged for free movement in the anode or cathode space, the respective fill levels will align themselves in the gravitational field. Higher or lower fill levels for the individual materials will result accordingly.

According to the invention, it is necessary that the anode material and the cathode material should be at least partially bonded with the ion-conducting separator. The ion-conducting separator is in particular configured as a solid body electrolyte, which is specifically ion-conducting, primarily where the solid body electrolyte is heated in excess of a predetermined service temperature (e.g. between 100° C. and 500° C.). For the configuration of specific ion conductivity, the ion-conducting electrolyte is doped with appropriate dopants. In this regard, a solid body electrolyte is particularly suitable as an ion-conducting electrolyte, as the latter remains substantially stable and unchanged, even at high service temperatures or in the case of large temperature variations.

The top region of the ion-conducting separator is a region of the energy store which, in normal operation, is arranged further removed from the center of gravity than the base region. Accordingly, the base region is a region of the ion-conducting separator which, in the normal operation of the electrochemical energy store, is arranged closer to the center of gravity. In other words, in normal operation, free-moving liquid and free-moving solid constituents of the anode material and the cathode material will accumulate in larger quantities in the base region of the ion-conducting separator, as a result of gravitational attraction. However, the top region and the base region may vary in respect of their absolute dimensions. For example, the top regional may occupy more than, less than or exactly one half of the ion-conducting separator, in a parallel dimensional direction to the earth's gravitational field. The same also applies naturally to the base region.

It is specifically advantageous that electrochemical energy stores should be configured as energy stores based upon sodium-nickel chloride (NaNiCl2) cell technology, or upon sodium-sulfur cell technology.

According to the invention, it is ensured that a current bridge (discharge bridge) for the constitution of a leakage current between the anode material and the cathode material is generated where, according to one potential form of embodiment, both the first fill level of the anode material and the second fill level of the cathode material are in contact with the conductivity section. Both the anode material and the cathode material are arranged on one side of the conductivity section respectively. As the conductivity section is incorporated in the ion-conducting separator, the anode material and the cathode material are also in contact with one side of the latter respectively. Electronic discharging via the conductivity section between the anode material and the cathode material results in a reduction in the cell voltage, based upon the reversible breakdown of the cathode material, with the formation of metallic aluminum in the cathode space. In the event of discharging via the current bridge thus formed, stored energy is lost by heat dissipation (ohmic losses) in the energy store. Consequently, the interior space of the energy store (anode space or cathode space), in the long-term duty of a plurality of series-connected electrochemical energy stores, is protected against unacceptably high voltages, associated with overcharging or the excessive delivery of electrical energy to the energy store. In other words, in a series circuit of a plurality of electrochemical energy stores, the electrochemical energy store with the highest state of charge is the first to be partially discharged, whereas all the remaining electrochemical energy stores with a lower state of charge will continue to be charged. Overall, the mutual equalization of the state of charge of all the electrochemical energy stores proceeds accordingly.

An advantageous consequence of the resulting equalization of the state of charge of the electrochemical energy stores is that, upon the discharging of the series-connected energy stores, all the energy stores reach their lowest permissible state of charge at approximately the same time. As a result of this simultaneity, it is less probable that individual electrochemical energy stores will undergo exhaustive discharge or even a reversal of polarity.

According to this embodiment, it may also be provided that the first fill level of the anode material or the second fill level of the cathode material only changes to the extent that it moves between the conductivity section and the insulation section. In the case in which only the fill level of the anode material in the anode space moves, it may be provided that, in the cathode space, an electronic charge carrier permits the execution of a direct discharge from the conductivity section to the cathode material or the cathode, regardless of the fill level of the cathode material. A fill level-independent bonding of the cathode material with the conductivity section can also be achieved, for example, by means of an appropriate carbon felt component and, for example, by means of a direct metallic conductivity bridge within the cathode space. In other words, in this case, an electronic connection between the cathode material or cathode and the conductivity section is formed according to the invention, which raises the conductivity section to the electrochemical potential of the cathode until such time as, during the charging process, in the event of a high state of charge of the electrochemical energy store, the anode material reaches the conductivity section, thus closing the electronic current bridge between the anode material and cathode material.

Electronic bonding of the conductivity section for the formation of a current bridge, which forms an electronic contact between the cathode material or the cathode on the one hand and the conductivity section on the other, can be achieved by various arrangements. A current bridge can be configured, for example, wherein both the anode material and the cathode material are in direct electronic contact with the conductivity section. Likewise, a current bridge of this type can be configured by the provision of a conductivity bridge on the side of the cathode space, which bridge forms an electrically conductive bond between the cathode material or cathode and the conductivity section. Even in this case, electronic discharging between the anode material and the cathode material or cathode can be anticipated. In the interests of greater efficiency, this conductivity bridge can also be wetted by the cathode material, wherein the latter coats areas of the conductivity bridge by capillary action. For example, a conductivity bridge of this type can be formed by carbon felt, which is then wetted by coating with the cathode material.

As an alternative to forms of embodiment based upon the fill level-independent bonding of the cathode material with the conductivity section, the fill level of the respective other material can also be consistently maintained at a sufficiently high fill level such that the latter is consistently in electrical contact with the conductivity section. If, for example, the fill level of the other material also enters into contact with the conductivity section, the current bridge is formed, thereby resulting in electrical discharging via the latter.

The current bridge configured according to this embodiment can therefore also be understood as an intermittent "short-circuit path" wherein, however, a reduction of the electronic resistance to values which are comparable to those of pure metal conductors is not anticipated. It is rather intended that discharge currents, in the sense of leakage currents, which are relatively small in comparison with the customary service currents of the electrochemical energy store, should prevent any overcharging of individual electrochemical energy stores in prolonged service.

It should be observed here that the cathode can also be considered in the sense of a positive electrode (positive pole) and the anode in the sense of a negative electrode (negative pole) during the discharging of the energy store. During the charging of the energy store, the respective designations of the poles (anode or cathode) are reversed accordingly.

It should also be observed that normal operation of the energy store refers to all operating states of the energy store which can be assumed by the latter. Specifically, these include a state assumed during charging, discharging or further functional states, including for example standby operation, with only very low current consumption.

In summary, it is therefore critical to the invention that at least one of the two materials of anode material and the cathode material, changes its fill level during the charging or discharging of the electrochemical energy store. The change in the fill level of the anode material, for example in the case of an energy store based upon a sodium-nickel chloride cell, may be up to 8 cm, or even more. In addition to electrochemical framework conditions, the fill level is also substantially codetermined by the geometry of the anode space or cathode space.

In the case of an electrochemical energy store which operates on the basis of a sodium-nickel chloride cell, the ion-conducting separator is configured as a ceramic separator. In this case, the separator shows the best possible ionic conductivity whereas, conversely, the electronic conductivity is simultaneously maintained at a minimum, or is strongly reduced. If a cell of this type is fully charged, the first fill level of the anode material in the anode space rises to a stipulated maximum value. If, however, this energy store is series-connected to further energy stores in an electrochemical storage module, the further delivery of electrical energy to the energy store would result in the overcharging of said energy store. According to this embodiment, any such overcharging is prevented by the formation of contact between the anode material (liquid sodium) and the conductivity section, thereby permitting an internal current discharge between the anode space and the cathode space.

By the appropriate selection of the geometry of the conductivity section (lengthwise or depthwise over the extent of the ion-conducting separator), and in respect of a material composition within the conductivity section, it is possible, for example, to further increase internal self-discharging as the state of charge rises, thereby permitting the improvement of the relative equalization of the states of charge of the individual energy stores which are connected in an electrochemical storage module, in comparison with other energy stores. Consequently, by the provision of a conductivity section of this type within the energy store, the equalization of individual states of charge within the system as a whole can be specifically executed, with reference to the respective individual state of charge. Accordingly, during a single charging operation, the state of charge of energy stores with a lower state of charge can be offset by that of the energy stores with a higher state of charge such that, over prolonged periods with the regular full charging of the storage module as a whole, the states of charge of the individual energy stores continue to be equalized.

According to a first embodiment of the electrochemical energy store, the ion-conducting separator is provided with an exactly-defined conductivity section and an insulation section, which adjoin each other. According to this embodiment, for example, the entire top region may be configured as electrically conductive, and thereby corresponds to the conductivity section. The ion-conducting separator is in particular configured in a cup shape, wherein it is specifically advantageous that the latter is of partially cylindrical section. Accordingly, an upper zone of this cup can be configured as a conductivity section, whereas the remainder of the ion-conducting separator can be configured as an insulation section in the base region. According to this embodiment, the insulation section corresponds to the ion-conducting separator, which shows poor electronic conductivity. By the provision of only one conductivity section, the simple production of the ion-conducting separator incorporating the conductivity section can be achieved.

According to a further embodiment of the energy store, it is provided that the conductivity section is in permanent electronic contact with the cathode material. Accordingly, it is sufficient for the generation of a leakage current via the conductivity section that a state of charge of the electrochemical energy store exists in which the anode material in the anode space is in contact with the conductivity section. For the generation of the leakage current, it is therefore sufficient that, during the operation of the energy store, only the anode material changes its first fill level, to the extent that the latter reaches the conductivity section.

According to a further form of embodiment, it may be provided that, during the normal operation of the energy store, the conductivity section on the side of the cathode space is wetted with the cathode material. Wetting can be achieved, for example, by means of auxiliary devices, for example by means of a sponge, a mesh, a felt pad or other devices which are appropriate for the execution of wetting. An arrangement is thus achieved whereby, as further described above, it is sufficient for the generation of a leakage current via the conductivity section that a state of charge of the electrochemical energy store exists in which the anode material in the anode space is in contact with the conductivity section.

According to a further form of embodiment of the electrochemical energy store, it is provided that the conductivity section is arranged such that, during the normal operation of the energy store, the conductivity section adjoins the insulation section at a uniform fill level. This uniform fill level corresponds to a potential fill level which can be achieved by the anode material or the cathode material. Accordingly, the uniform fill level can be understood in the sense of a boundary line which, upon achievement by the anode material or the cathode material, coincides with the fill levels thereof. In other words, the conductivity section is not configured such that there is a plurality of potential levels of the boundary line between the conductivity section and the insulation section. According to this embodiment the conductivity section is specifically embodied in a circumferentially closed arrangement, whereby the end of the conductivity section (boundary line) which is arranged closer to the base region, in the normal operation of the energy store, may follow a horizontal profile. Normal operation of the energy store typically requires a parallel orientation of the top and base regions to the earth's field of gravity. The uniformity of the fill level (boundary line) is dictated by the accuracy of the production and the measuring process. According to this embodiment, an accuracy of ±1-2 mm is appropriate. By the provision of a uniform fill level (boundary line), at which the conductivity section adjoins the insulation section, for example, at a specific state of charge of the energy store, it is possible to achieve a targeted discharge via the internal conductivity section. Accordingly, for example, even in the event of the complete charging of an electrochemical energy store, any further charging can be prevented, in that the uniform fill level (boundary line) between the conductivity section and the insulation section corresponds to the maximum stipulated fill level of the anode material or cathode material.

According to a specifically advantageous form of embodiment of the invention, it is provided that, in the direction running from the base region to the top region, the conductivity section occupies an increasing proportion of the overall size of the ion-conducting separator. As a result of the changing proportion towards the top region, in the event of a rising fill level, it is also possible, for example, to generate an increasingly large leakage current, where the cathode material already lies above the fill level of the anode material. It is thereby possible to achieve an appropriate adjustment of the leakage current to the changing state of charge of the energy store.

A further concept is also possible, in that the uniform fill level defined by the boundary line between the conductivity section and the insulation section corresponds to a state of charge of the electrochemical store not exceeding 100% of the maximum charge, and not exceeding a specifically advantageous 95% of the maximum charge. In this case, the fill level relates specifically to the fill level of the anode material in the anode space. Accordingly, internal self-discharging will only occur in fully-charged energy stores, thereby protecting the energy stores against overcharging. Where the uniform fill level (boundary line) corresponds to a maximum 95% of the maximum charge, manufacturing inaccuracies in the ion-conducting separator which might otherwise permit overcharging, on the grounds that the maximum fill level may only be estimable with insufficient accuracy, can also be advantageously offset or considered. Specifically, on the grounds of diffusion processes during the production process, the boundary zone between the conductivity section and insulation section may vary slightly.

According to a further form of embodiment of the invention, it is provided that the conductivity section and the insulation section are comprised of an identical base material, in particular a ceramic, wherein the conductivity section is doped with at least one element which delivers a higher electronic conductivity than the base material. The base material is advantageously Na-$\beta$-Al2O3 or Na-$\beta$"-Al2O3. Doping is advantageously preferably effected using elements from the second to fifth main groups and/or transition elements. Elements from the earth alkali metal group and/or transition metals are specifically advantageous. Particularly advantageous elements are iron, chromium, manganese, molybdenum, cobalt, nickel, copper, titanium, tungsten, antimony, bismuth, magnesium and combinations thereof. The base material is the material from which the greater part of the ion-conducting separator is formed, or which constitutes the base structure thereof. It is typically a carrier material, which is designed to accommodate further materials which will endow the separator with different conductivity properties, or with other chemical and physical properties.

Appropriate conductivity is typically achieved by the corresponding doping of the base material. Dopants in the base material show a higher intrinsic electronic conductivity. Doping results in an ion-conducting separator with improved stability in response to thermal and mechanical external influences. By the strength of doping, it is also possible to achieve a targeted setting for the self-discharging current. It is also possible to incorporate spatial variation in the doping of the base material such that, for example, a variation in internal self-discharging over time can be achieved during the charging of the electrochemical energy store.

According to a further embodiment of the invention, it is provided that the conductivity section and the insulation section are comprised of an identical base material, in particular a ceramic, wherein the conductivity section is provided with an electronically conductive, percolated secondary phase. In this case, the secondary phase can advantageously be formed of an elementary metal (nickel, copper or silver), or may be comprised, for example, of a metal alloy (advantageously on the basis of Ni, Ag, Cr, Co, Cu and/or Fe), or may be comprised of a metal oxide compound (specifically on the basis of $Cr_2O_3$, $In_2O_3$, $Mn_xO_y$, $Fe_xO_y$, $CeO_2$, $Co_xO_y$ or $TiO_2$, whereby a perovskite compound of the general formula (RE, AE) (Fe, Ti, Cr, Mn, Co, Ni) O3 is specifically advantageous, wherein RE is a rare earth and AE is at least an earth alkali element, or the secondary phase is comprised of an electronically conductive non-metal, such as carbon. A carbon-based conductivity section can be achieved, for example, by the carbonization of a polymer resin object. Combinations of the above-mentioned secondary phases are possible. All the above-mentioned secondary phases, or the parent materials thereof, are suitable for the incorporation of a secondary phase in the majority of separators. Specifically, these materials are suitable for incorporation in a ceramic separator.

According to a further form of embodiment of the invention, it is provided that the ion-conducting separator is configured as a solid body electrolyte, which is specifically ion-conducting. A specific ion conductivity is present where only one or more ion species of a specified chemical type are able to pass through the ion-conducting separator. A specific ion conductivity can be achieved by the doping of the base material of the ion-conducting separator. The configuration of an appropriately formed conductivity section can also be achieved by the appropriate zonal doping of the separator. Accordingly, both the ion conductivity and the electronical conductivity can be zonally achieved by the same or similar methods (doping methods).

According to this embodiment, it is also advantageous that the electrochemical energy store is configured based upon sodium-nickel chloride cell technology, or upon sodium-sulfur cell technology. These cells feature a technically-dictated maximum state of charge, which should not be exceeded, if the risk of damage to cells is to be prevented. Overcharge protection in these cells can thus contribute to the extension of their service life.

It is also provided, according to a further form of embodiment of the invention, that the service temperature of the electrochemical energy store during discharging is no lower than 100° C., and in particular no lower than 200° C. Specifically, the service temperature during discharging does not exceed 500° C. The service temperature thus lies within the typical service temperature range for energy stores operating by sodium-nickel chloride cell technology, and for energy stores operating by sodium-sulfur cell technology.

According to a further form of embodiment of the electrochemical storage module, it is provided that the storage module comprises an electronic charge management system, which incorporates no circuitry, and is designed for the equalization of an unequal state of charge in at least two electrochemical energy stores. Accordingly, in an electrochemical storage module, no additional circuitry is required in order to achieve the equalization of the individual states of charge in the individual energy stores. This is a particularly cost-effective arrangement, and is also advantageous in respect of electronic susceptibility.

According to a potential form of embodiment of the method according to the invention for the production of an electrochemical energy store, the base component is configured as a ceramic base component, which is sintered or stabilized by heat treatment. In this case, additives do not necessarily need to be identical to the doping elements or the materials for the configuration of a secondary phase itself. It is also possible that these are only configured during thermal stabilization by chemical reaction with the base material of the base component or with the materials incorporated therein. According to this embodiment, infiltration may also proceed only zonally or sectionally such that, for example, only predetermined zones are endowed with a conductivity section, while other untreated sections, however, remain as an insulation section or a section with lower electronic conductivity than the conductivity section.

According to an advantageous further development of the method according to the invention for the production of an electrochemical energy store, it is possible for infiltration to proceed by one of the following methods; —Pressure infiltration with a suspension or a solution; —Immersion infiltration with a suspension or a solution; —Sol-gel separation; —Chemical gas phase separation; —Physical gas phase separation; —Electrophoretic separation.

The above list does not constitute any restriction in respect of infiltration methods; specifically, other methods are possible.

All of these individual methods are suitable for the configuration of a conductivity section in the ion-conducting separator. Specifically, by these methods, the non-destructive treatment of base components with further materials is possible. These methods also permit the achievement of an advantageous location resolution such that, on the ion-conducting separator, it is only necessary to treat specific areas in order to achieve the configuration of an appropriately formed conductivity section.

According to a further form of embodiment of the method according to the invention, it is provided that the thermal treatment of the base component proceeds under an oxidizing atmosphere, specifically under an oxygen-bearing atmosphere. An oxygen-bearing atmosphere is specifically suitable for base components which incorporate a metal oxide compound for the configuration of a secondary phase, or which have been doped with appropriate dopants. Alternatively, a reducing atmosphere may also be advantageous and, for example, may be appropriate to the other above-mentioned materials for the configuration of a conductive secondary phase in the separator. According to a further form of embodiment, for the configuration of a non-metallic secondary phase, a polymer (e.g. epoxy resin) may be applied to the separator whereby, after thermal treatment (carbonization), only a carbon matrix remains, which shows sufficient electronic conductivity. Accordingly, it is therefore also provided that the thermal treatment of the base component proceeds under a reducing atmosphere, specifically by the carbonization of a base component to which a polymer resin has been applied, under a reducing atmosphere.

The invention is described in greater detail hereinafter with reference to the individual forms of embodiment represented in FIGS. 1 to 3. It should be noted that the figures are only to be considered as schematic, and do not constitute any restriction in respect of executability.

The technical characteristics represented in the figures may also be claimed in any mutual combination desired, provided that the combination is appropriate to the fulfilment of the object according to the invention.

It should also be noted that all technical characteristics which carry the same reference numbers deliver the same technical effects or functions.

BRIEF DESCRIPTION OF THE DRAWINGS

Herein.

DETAILED DESCRIPTION OF INVENTION

Figure 1:
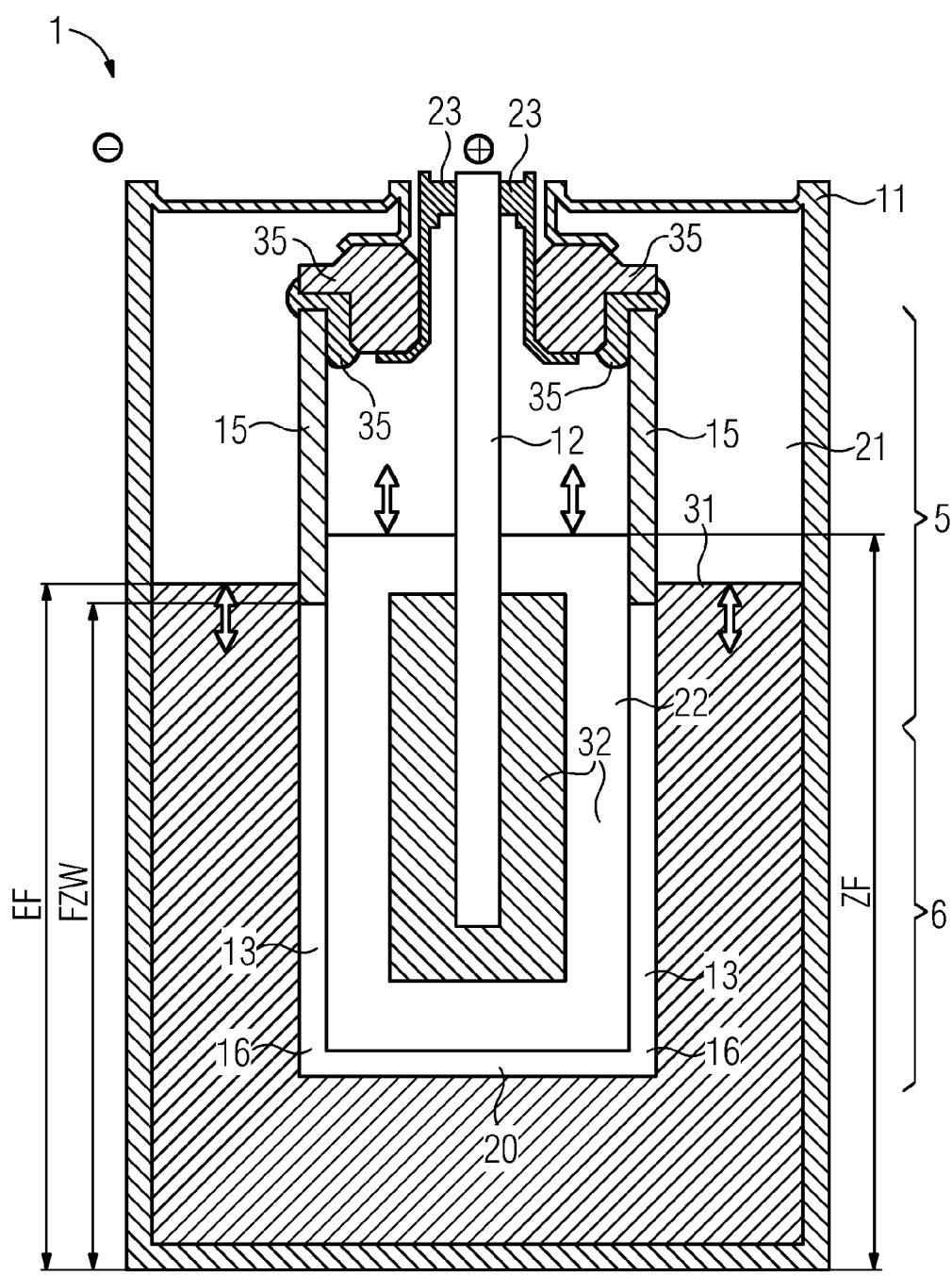
FIG. 1 shows a first form of embodiment of an electrochemical energy store 1 according to the invention, in a lateral sectional view.

FIG. 1 shows an electrochemical energy store, with an anode 11 and a cathode 12. The cathode 12 is further provided with a cathode cover 23, which partially closes the cathode space 22 at its upper end. The anode 11 is electrically bonded with an anode space 21, in which an anode material 31 with a first fill level EF is arranged. The cathode 12 respectively is electrically bonded with a cathode space 22, in which a cathode material 32 with a second fill level ZF is arranged.

The electrochemical energy store 1 also comprises an ion-conducting separator 13, in this case in a cup-shaped configuration. According to the normal operation of the electrochemical energy store 1, both the at least partially free-moving anode material 31 and the at least partially free-moving cathode material 32 shown in the representation are arranged further downwards as a result of the action of gravity. Consequently, the materials 31, 32 are arranged closer to the base region 6 of the ion-conducting separator than to the top region 5. In order to maintain a gas-tight bond between the anode 11 or cathode 12 and the ion-conducting separator 13, the energy store 1 is provided with a sealing material 35 which is configured, for example, in the form of glass solder and/or as a ceramic ring ($\alpha$-Al2O3). The sealing material 35 permits the formation of a gas-tight bond between the anode 11, the cathode 12 and the ion-conducting separator 13 such that no material exchange can proceed between the anode space 21 and the cathode space 22, whereby any exchange of charge is also prevented.

In the normal operation of the energy store 1, the first fill level EF is mutually inversely correlated to the second fill level ZF. Where the electrochemical energy store 1 is charged, for example, the first fill level EF of the anode material rises, simultaneously associated with a fall in the cathode material in the cathode space 22. Likewise, during the discharging of the electrochemical energy store 1, the first fill level EF in the anode space 21 falls, in conjunction with a rise in the second fill level ZF of the cathode material 32. Both the anode material 31 and the cathode material 32 are in contact with the ion-conducting separator 13.

The cup-shaped ion-conducting separator 13 is primarily formed of a base material 20. In the top region 5 of the separator 13 a conductivity section 15 is arranged, which is represented in the figure by a hatched section. In the normal operation of the energy store 1, the conductivity section 15, at a uniform fill level (boundary line) (FZW) (or corresponding to a uniform fill level (boundary line) of this type FZW), adjoins a region of the ion-conducting separator 13 which shows a lower electronic conductivity. Specifically, the region of the separator 13 which is not configured as the conductivity section 15 is entirely configured as an insulation section 16. Accordingly, the insulation section 16 and the conductivity section 15 adjoin each other at a uniform fill level (boundary line) (FZW) (or corresponding to a uniform fill level (boundary line) of this type FZW).

According to the invention, a state of charge of the electrochemical energy store 1 exists in which the anode material 31 in the anode space 21, the cathode material 32 in the cathode space 22, or another appropriate electronic conductor in the cathode space, are bonded to a respectively opposite side of the separator 13. As a result of the higher electronic conductivity of the conductivity section 15, a current bridge is formed, whereby an internal self-discharging current is generated in the interior of the energy store 1 via the separator 13. Accordingly, this results in a direct discharge, wherein both the anode material 31 and the cathode material 32 undergo a material change by chemical reaction. Consequently, as a result of the formation of the current bridge, there is also a reduction in the internal cell voltage, and any free heat of reaction released by the generation of the self-discharging current is dissipated in the interior of the energy store 1.

In response to spatial variations in conductivity within the conductivity section, however, it may also occur that the first fill level EF of the anode material 31 exceeds the fill level FZW (boundary line) dictated by the conductivity section 15 if, for example, the region of the conductivity section 15 which is arranged closer to the base region 6 permits only a small internal discharge of current. Accordingly, it is also possible, as expressly represented in FIG. 1, that the first fill level EF of the anode material 31 exceeds the fill level (FZW) (boundary line) dictated by the conductivity section 15. In this case, however, it is advantageously ensured that any such overrun, in the normal operation of the electrochemical energy store 1, is consistently maintained below the maximum fill level for the anode material 31.

Figure 2:
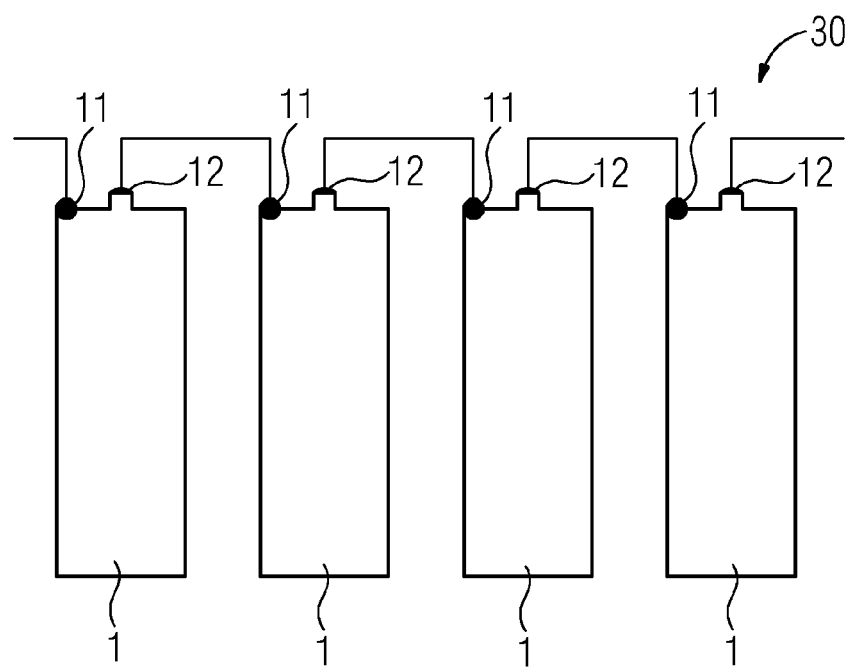
FIG. 2 shows a lateral sectional view of an electrochemical storage module 30 comprising a plurality of individual electrochemical energy stores 1.

FIG. 2 shows a schematic lateral sectional view of an electrochemical storage module 30, which is provided with a plurality of mutually electrically series-connected electrochemical energy stores 1. In the series circuit, a cathode 12 of one energy store is bonded to the anode 11 of an adjoining energy store 1 in each case.

Figure 3:
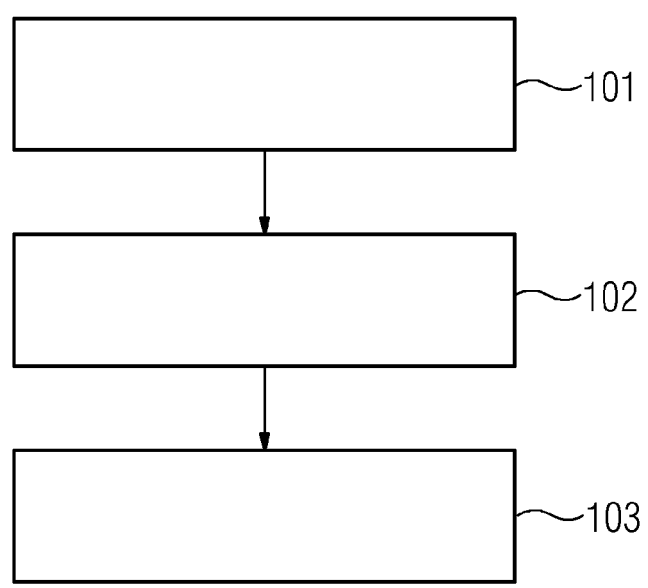
FIG. 3 shows a flow diagram representing a form of embodiment of the method according to the invention for the production of an electrochemical energy store 1, as represented previously or hereinafter.

FIG. 3 shows a flow diagram representing a form of embodiment of the method according to the invention for the production of an electrochemical energy store 1, comprising the following steps: —The production of an ion-conducting separator 13 by the formation of a molded base component (first process step 101); —Impregnation of the base component with additives which are appropriate to the formation of an electronically conductive conductivity section 15, further to heat treatment (second process step 102); —Heat treatment of the base component, for the stabilization thereof (third process step 103).

Further forms of embodiment proceed from the sub-claims.

The invention claimed is:

1. An electrochemical energy store comprising:
an anode, which is electrically connected to an anode space in which an anode material with a first fill level (EF) is arranged, and
a cathode, which is electrically connected to a cathode space in which a cathode material with a second fill level (ZF) is arranged,
wherein at least one of the two materials of anode material and cathode material, changes its fill level (EF, ZF) during the charging or discharging of the electrochemical energy store, and
an ion-conducting separator, which separates the anode space from the cathode space, wherein, in the normal operation of the electrochemical energy store, the ion-conducting separator is provided with a top region and a base region,
a conductivity section in the top region of the ion-conducting separator, which, in the normal operation of the electrochemical energy store, has a higher electronic conductivity than an electronically-insulating insulation section in the base region,
wherein at least one state of charge of the electrochemical energy store exists in which the anode material in the anode space is bonded with the conductivity section, and a current bridge for the constitution of a leakage current is generated between the anode material and the cathode material.

2. The electrochemical energy store as claimed in claim 1, wherein the ion-conducting separator comprises an exactly-defined conductivity section and an insulation section, which adjoin each other.

3. The electrochemical energy store as claimed in claim 1, wherein the conductivity section is arranged such that, during the normal operation of the energy store, the conductivity section adjoins the insulation section at a uniform fill level (FZW).

4. The electrochemical energy store as claimed in claim 3, wherein the uniform fill level (FZW) corresponds to a state of charge of the electrochemical store not exceeding 100% of the maximum charge.

5. The electrochemical energy store as claimed in claim 3, wherein the uniform fill level (FZW) corresponds to a state of charge of the electrochemical store not exceeding a specifically preferred 95% of the maximum charge.

6. The electrochemical energy store as claimed in claim 1, wherein the conductivity section and the insulation section are comprised of an identical base material, wherein the conductivity section is doped with at least one element which delivers a higher electronic conductivity than the base material.

7. The electrochemical energy store as claimed in claim 6, wherein the identical base material comprises a ceramic.

8. The electrochemical energy store as claimed in claim 1, wherein the conductivity section and the insulation section are comprised of an identical base material, wherein the conductivity section is provided with an electronically conductive, percolated secondary phase.

9. The electrochemical energy store as claimed in claim 8, wherein the identical base material comprises a ceramic.

10. The electrochemical energy store as claimed in claim 1, wherein the ion-conducting separator is configured as a solid body electrolyte, which is ion-conducting.

11. The electrochemical energy store as claimed in claim 1, wherein the electrochemical energy store is configured based upon sodium-nickel chloride cell technology, or upon sodium-sulfur cell technology.

12. The electrochemical energy store as claimed in claim 1, wherein the service temperature of the electrochemical energy store during discharging is no lower than 100° C.

13. An electrochemical storage module, comprising:
at least two electrochemical energy stores as claimed in claim 1,
wherein the at least two electrochemical energy stores are electrically interconnected in series.

14. The electrochemical storage module as claimed in claim 13,
wherein the electrochemical storage module comprises an electronic charge management system, which incorporates no circuitry, and is designed for the equalization of an unequal state of charge in at least two electrochemical energy stores.

15. A method for producing an electrochemical energy store as claimed in claim 1, the method comprising:
producing an ion-conducting separator by the formation of a molded base component;
impregnating the base component with additives which are appropriate to the formation of an electronically conductive conductivity section, further to heat treatment; and
heat treating the base component, for the stabilization thereof.

16. The method as claimed in claim 15, further comprising:
infiltrating by one of the following: pressure infiltration with a suspension or a solution; immersion infiltration with a suspension or a solution; sol-gel separation; chemical gas phase separation; physical gas phase separation; and electrophoretic separation.

17. The method as claimed in claim 15,
wherein the heat treatment of the base component proceeds under an oxidizing atmosphere.

18. The method as claimed in claim 15,
wherein the heat treatment of the base component proceeds under a reducing atmosphere.

19. The method as claimed in claim 15,
wherein the heat treatment of the base component proceeds under an oxygen-bearing atmosphere.

20. The method as claimed in claim 15,
wherein the heat treatment of the base component proceeds by the carbonization of a base component to which a polymer resin has been applied, under a reducing atmosphere.

21. The electrochemical energy store as claimed in claim 1,
wherein the service temperature of the electrochemical energy store during discharging is no lower than 200° C.

* * * * *